United States Patent [19]
Stingl

[11] Patent Number: 5,934,852
[45] Date of Patent: Aug. 10, 1999

[54] VISIBLE SCREWS

[75] Inventor: David A. Stingl, Great Falls, Va.

[73] Assignee: O.I.A. LLC, McLean, Va.

[21] Appl. No.: 08/896,678

[22] Filed: Jul. 18, 1997

Related U.S. Application Data

[60] Provisional application No. 60/022,675, Jul. 26, 1996.

[51] Int. Cl.⁶ .............. F16B 19/00; F16B 33/00; F16B 35/02
[52] U.S. Cl. .............. 411/372.5; 411/377; 411/13; 411/383
[58] Field of Search ................ 411/13, 14, 372, 411/373, 377, 431, 902, 903, 908, 383, 372.5

[56] References Cited

U.S. PATENT DOCUMENTS

| | | | |
|---|---|---|---|
| 3,693,495 | 9/1972 | Wagner | 411/377 |
| 4,452,556 | 6/1984 | Nelson et al. | 411/903 X |
| 4,717,302 | 1/1988 | Adams et al. | 411/903 X |
| 4,837,090 | 6/1989 | Hyner et al. | 411/903 X |
| 4,948,319 | 8/1990 | Day et al. | 411/377 |
| 5,156,509 | 10/1992 | Wu | 411/377 X |
| 5,290,131 | 3/1994 | Henriksen | 411/377 X |
| 5,417,529 | 5/1995 | Volkmann et al. | 411/13 X |

FOREIGN PATENT DOCUMENTS

| 1921753 | 11/1970 | Germany | 411/903 |
|---|---|---|---|

Primary Examiner—Neill Wilson
Attorney, Agent, or Firm—James Creighton Wray; Meera P. Narasimhan

[57] ABSTRACT

The invention is a connector that provides for visual recognition from remote locations and under poor visibility conditions. It may be a screw with a colored head. The screw, including the threaded shaft and the head, may be of steel, brass, plastic or any other acceptable material or combination of materials thereof. The entire or parts of the screw may be colored or plated with a colored layer or have a colored coating. Coating may include a layer of paint. For aquatic applications the paint layer is water resistant and chemical resistant and is of a color that is easily identifiable from a water surface. It may be a fluorescent paint coating. Any appropriate color or kind of paint may be used. Other coatings may be applied, such as ink coatings. The connector may have a colored cap connectable to the head of the connector. The cap may be attached following securement or may be positioned over the screw before securement. The cap may include a surface for receiving the head of a screwdriver shaft or for withstanding the impact of a hammer. The cap may be glove-fit or secured to the screw head by any attachment means. The colored cap may expose the socket on the head which receives the driver. The indicator may also be a colored disk fitted on the screw having coatings of paint or ink or epoxy and may be fluorescent. The screws may be used in pools, hot tubs, spas and whirlpools and the like. By securing grates in bottoms of pools, spas, hot tubs and whirlpools using screws having colored heads as indicators, inspectors, owners and users can immediately identify an unsecured grate from the water surface.

55 Claims, 2 Drawing Sheets

VISIBLE SCREWS

This application claims the benefit of U.S. Provisional Application No. 60/022,675, filed Jul. 26, 1996.

BACKGROUND OF THE INVENTION

The present invention relates to connectors for securing drain grates in aquatic environments.

Swimming pools, spas, hot tubs and whirlpool baths include drains for water circulation and filtering. Grates are positioned over the drains. Generally, the grates are mounted over the drains using stainless steel screws. During drain cleaning and other pool maintenance, the grates are unscrewed and removed from their positions over the drains. Upon completion of the maintenance project, the grates are either returned to their positions over the drains or replaced. Occasionally, pool maintenance specialists inadvertently fail to screw the grates over the drains. Such inadvertent omissions have resulted in tragic accidents and loss of human lives.

Commercial pools, spas, hot tubs and whirlpool baths are periodically inspected for potential hazards. Generally, private pools are also inspected by the owner or private contractor. During those inspections, visual checks are made to ensure that grates are properly positioned and secured over the drains. Since stainless steel screws are not visible from the surface of the pool and inspectors generally do not enter a pool filled with water, no checks for proper screw attachments of the grates are made. Thus, loose or unsecured grates remain undetected.

Needs exist for improvements that allow for verification of proper grate alignment and securement from outside a water-filled pool.

SUMMARY OF THE INVENTION

The present invention is a connector that provides for visual recognition from remote locations and under poor visibility conditions. In its most basic embodiment, the present invention is a screw having a colored head. The screw, including the threaded shaft and the head, is made of stainless steel, brass, plastic or any other acceptable material or combination of materials thereof. The entire screw may be colored or plated with a colored layer or a colored coating may be applied to the head of the screw. Preferably, the color is distinct from the mounted or secured object, such as a grate.

In preferred embodiments of the present invention, the coating includes a layer of paint applied to the head of the screw or other connector. For aquatic applications, such as drain grate securement, the paint layer should be water resistant and chemical resistant and preferably is of a color that is easily identifiable from a water surface. In one preferred embodiment, the paint layer is a fluorescent paint coating. Any appropriate color or kind of paint may be used. Other coatings, such as ink coatings, or epoxy or the like, may also be appropriate.

In another preferred embodiment of the present invention, a colored cap is connectable to the head of the connector. In one preferred embodiment the cap is attached to the screw or other connector head following securement. In other preferred embodiments, the cap is positioned over the head prior to securement. In those embodiments, the cap may include a surface for receiving the head of a screwdriver shaft or for withstanding the impact of a hammer.

The cap may be secured to the screw head by fitting over the screw head like a glove or by use of attachment means, such as adhesive. The colored cap may expose the socket on the head which receives the driver. Alternatively the indicator may be a colored disk which conforms to the mounting screw recess.

The present invention has immediate applications in the pool, hot tub, spa and whirlpool industries. By securing grates in bottoms of pools, spas, hot tubs and whirlpools using screws having colored heads as indicators, inspectors, owners and users can immediately identify an unsecured grate from the water surface, prior to entry of any persons into the water.

These and further and other objects and features of the invention are apparent in the disclosure, which includes the above and ongoing written specification, with the claims and the drawings.

DETAILED DESCRIPTION OF THE PREFERRED EMBODIMENTS

Figure 1:
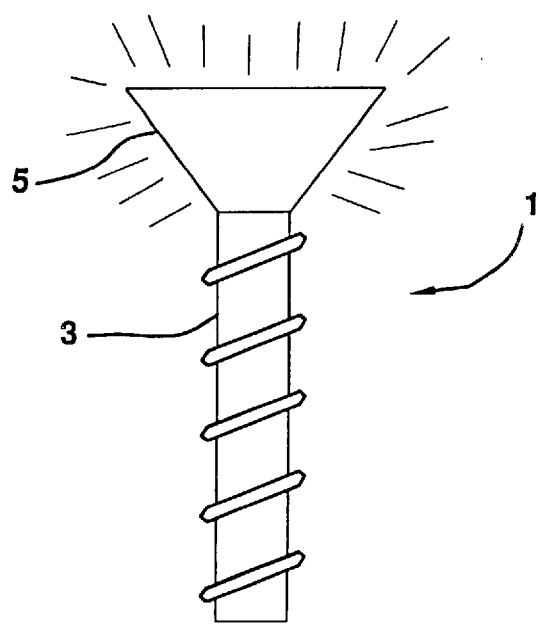
FIG. 1 shows one possible connector having a colored head.

FIG. 1 shows a preferred embodiment of the present connector 1. The connector 1 is a screw having a threaded shaft 3 and a head 5. The head 5 has a colored coating. Alternatively, the head 5 may be a colored piece that is permanently or removably secured to the shaft 3. The coating may be any color and is preferably an ink, epoxy, or paint coating. Preferably, the color of the head 5 is one that is easily recognizable from the article being mounted. In preferred embodiments, the head 5 is fluorescent.

The entire head 5, or only a portion of the head 5, may be covered with the colored coating. While the entire connector 1, including the shaft 3 and the head 5, may have a colored coating or be made of a colored material, it is only necessary in most applications to provide a connector 1 having a colored head 5.

In one preferred embodiment of the present invention, the connector 1 is a safety release screw having a threaded shaft 3 removably connected to a colored head 5. The head 5 may have a colored coating or may be made of colored plastic or some other colored or dyed material.

Figure 2:
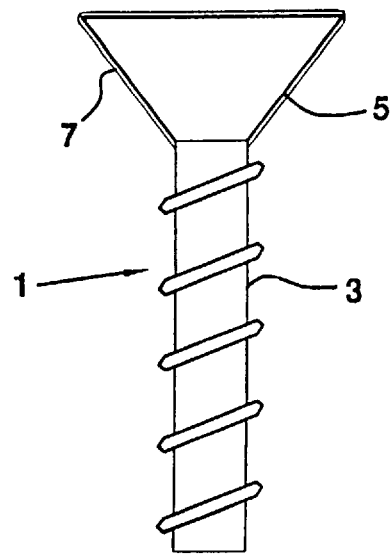
FIG. 2 shows another embodiment of the present invention wherein the connector is a screw having a threaded shaft, a head and a color cap positioned over the head.

FIG. 2 shows another preferred embodiment of the present connector 1. The connector 1 includes a shaft 3, a head 5 and a colored cap 7 positioned over the head 5. The cap 7 may be made of an elastic material that form-fits and grips sides of the head 5. In other embodiments, adhesive or some other attachment means is used to connect the cap 7 to the head 5. The cap 7 may be removably or permanently attached to the head 5 of the connector In all embodiments, the present invention 1 may be a screw, a nail or any other connector. The screw, nail or other connector is made of any acceptable material or combination of materials, including, but not limited to, stainless steel, brass and plastic.

Figure 3:
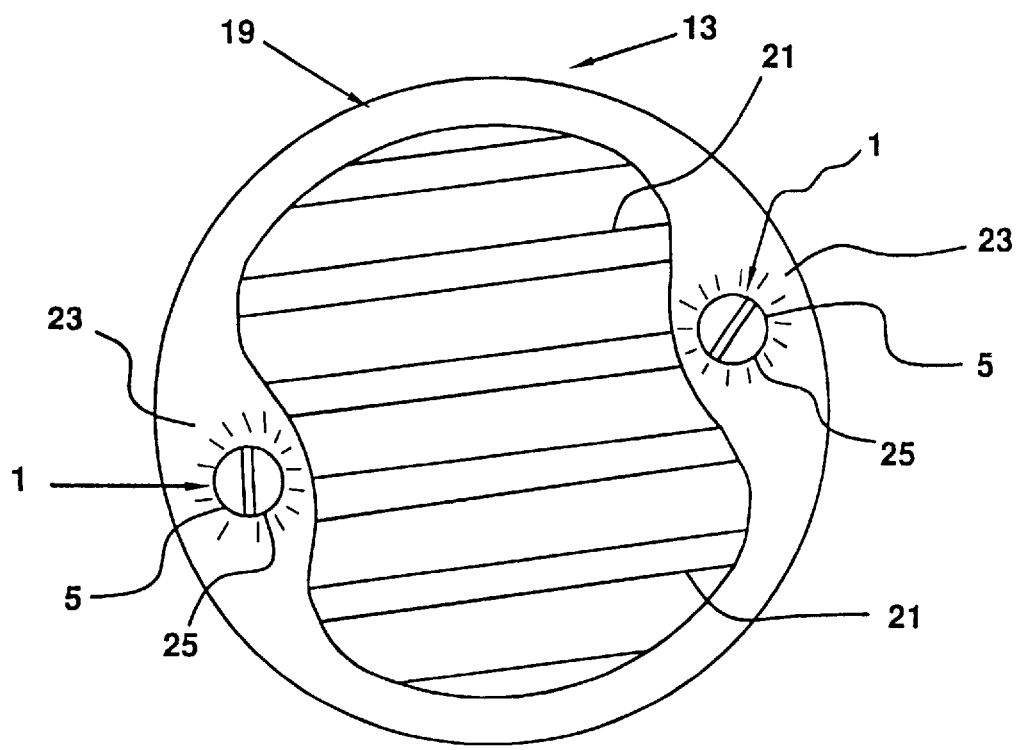
FIG. 3 is a plan view of a grate mounted over a main drain using the present connectors.
Figure 4:
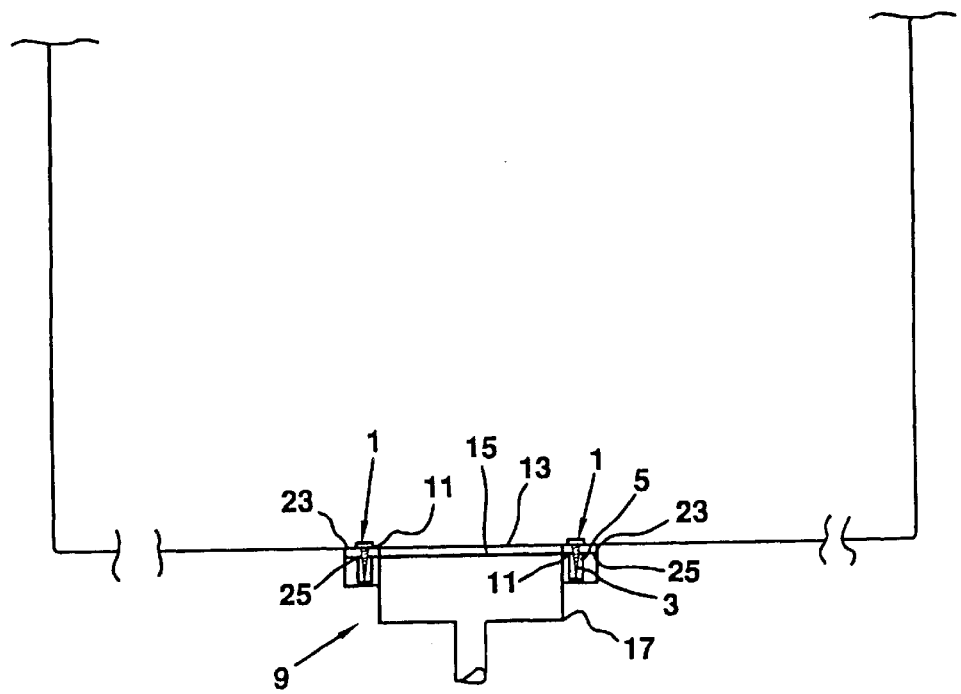
FIG. 4 shows the placement and securement of the grate over a main drain in a pool using the present connectors.

FIGS. 3 and 4 show a drain 9 in which openings 11 are formed and threaded to receive screws 1 which hold a drain grate 13 in position on the drain opening 15. Usually, the drain top 17 is a pre-cast member which is embedded in the structure of the pool. The drain grate 13 has a frame 19 with cross-elements 21 which may be strips or a flat plate with circular openings, or a screen. Recessed areas 23 are provided at the sides of the frame 19. Openings 25 in the recessed areas 23 allow the threaded shaft 3 of the connector 1 to pass, but restrict passage of the colored head 5 when the grate 13 is fastened to the drain top 17. By providing the head of the connector a different color than the drain, the absence of screws in the holes becomes readily recognizable from remote locations.

Figure 5:
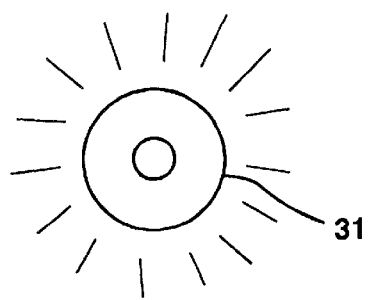
FIG. 5 is a top plan view of a colored disk connectable to the screw.

FIG. 5 shows a top plan view of a colored disk 31 connectable to the screw. The disk may be in the form of a washer or have any other shape.

Figure 6:
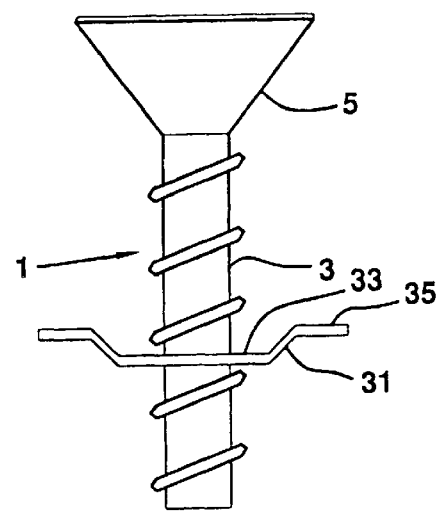
FIG. 6 is a side elevation of the disk of FIG. 5 mounted on the screw.

As seen in FIG. 6 which is a side elevation of the disk 31 mounted on the screw 1, disk 31 may be formed with a screw receiving portion 33 surrounded by an elevated circumference 35. The disk 31 may be of any color. Preferably, disk 31 may be coated with ink, paint or epoxy. It may also be fluorescent to be recognized from remote locations. The disk preferably has a color different from that of the grate or any surrounding environment to be easily recognizable.

While the invention has been described with reference to specific embodiments, modifications and variations of the invention may be constructed without departing from the scope of the invention, which is defined in the following claims.

I claim:

1. Connectors visually recognizable from remote locations and under poor visibility conditions, each connector comprising a screw having a colored head, further comprising a threaded shaft on the screw connected to the colored head, wherein the head and the shaft are of a combination of metal and plastic materials respectively.

2. The connectors of claim 1, wherein the head and the shaft are of colored material.

3. The connectors of claim 1, wherein the head and the shaft are plated with a colored layer.

4. The connectors of claim 1, wherein the head is fluorescent.

5. The connectors of claim 1, wherein the colored coating is a fluorescent paint coating.

6. The connectors of claim 1, wherein the head has a colored coating.

7. The connectors of claim 6, wherein the colored coating includes water- and chemical-resistant paint of a color easily identifiable from a water surface when the connector is in an aquatic environment.

8. The connectors of claim 1, wherein the head and shaft have a colored coating.

9. The connectors of claim 8, wherein the colored coating includes water- and chemical-resistant paint of a color easily identifiable from a water surface when the connector is functional in an aquatic environment.

10. The connectors of claim 9 or 11, wherein the coating is an ink coating.

11. The connectors of claim 6 or 8, wherein the colored head has an epoxy coating.

12. Connectors of claim 1 visually recognizable from remote locations and under poor visibility conditions each connector comprising a flat head screw, a colored cap connectable to a head of the screw.

13. The connectors of claim 12, further comprising a surface on the cap adapted for receiving a screwdriver.

14. The connectors of claim 13, further comprising a surface on the cap adapted for withstanding an impact of a hammer.

15. The connectors of claim 12, wherein the cap is connected to the screw by threaded fittings.

16. The connectors of claim 12, wherein the cap is connected to the screw by adhesive.

17. The connectors of claim 12, wherein the cap is connected to the screw by glove-fitting.

18. The connectors of claim 12, wherein the cap has an opening complementary to a recess on the head of the screw for receiving a driver.

19. The connectors of claim 12, wherein the connector is of stainless steel material.

20. The connectors of claim 12, wherein the connector is of brass material.

21. The connectors of claim 12, wherein the connector is of plastic material.

22. The connectors of claim 12, wherein the connector is of a combination of metal and plastic materials.

23. The connectors of claim 12, wherein the connector is of colored material.

24. The connectors of claim 12, wherein the connector is plated with a colored layer.

25. The connectors of claim 12, wherein the connector has a colored coating.

26. The connectors of claim 25, wherein the colored coating includes water- and chemical-resistant paint of a color easily identifiable from a water surface when the connector is in an aquatic environment.

27. The connectors of claim 12, wherein the head has a colored coating.

28. The connectors of claim 25 or 27, wherein the colored indicator has an epoxy coating.

29. The connectors of claim 27, wherein the colored coating includes water- and chemical-resistant paint of a color easily identifiable from a water surface when the connector is in an aquatic environment.

30. The connectors of claim 12, wherein the head is fluorescent.

31. The connectors of claim 27, wherein the colored coating is a fluorescent paint coating.

32. The connectors of claim 25 or 27 wherein the coating is an ink coating.

33. The connectors of claim 12, wherein the cap is a colored disk.

34. The connectors of claim 33, wherein the colored disk is shaped as a washer.

35. The connectors of claim 34, wherein the colored disk comprises a screw receiving portion and a ridge surrounding the screw receiving portion.

36. The connectors of claim 33, wherein the disk has a colored coating.

37. The connectors of claim 36, wherein the coating is paint, ink or epoxy coating.

38. The connectors of claim 33 wherein the disk is fluorescent.

39. Connectors of claim 6 visually recognizable from remote locations and under poor visibility conditions in pools, hot tubs, spas and whirlpools each connector comprising a colored indicator on the screw, grates in bottoms of pools, spas, hot tubs and whirlpools, said screws with the colored indicator securing the grates on the bottoms and alerting of an unsecured grate from a water surface.

40. The connectors of claim 39, wherein the colored indicator is a head of the screw.

41. The connectors of claim 39, wherein the colored indicator is a cap connectable to the screw.

42. The connectors of claim 39, wherein the connector is of stainless steel material.

43. The connectors of claim 39, wherein the connector is of brass material.

44. The connectors of claim 39, wherein the connector is of plastic material.

45. The connectors of claim 39, wherein the connector is of a combination of metal and plastic materials.

46. The connectors of claim 39, wherein the connector is of colored material.

47. The connectors of claim 39, wherein the connector is plated with a colored layer.

48. The connectors of claim 39, wherein the colored indicator has a colored epoxy coating.

49. The connectors of claim 46, wherein the colored coating includes water- and chemical-resistant paint of a color easily identifiable from a water surface when the connector is in pools, hot tubs, spas and whirlpools.

50. The connectors of claim 39, wherein the connector has a colored coating.

51. The connectors of claim 50, wherein the colored coating includes water- and chemical-resistant paint of a color easily identifiable from a water surface when the connector is in pools, spas, hot tubs and whirlpools.

52. The connectors of claim 39, wherein the colored indicator is fluorescent.

53. The connectors of claim 39, wherein the colored indicator has a fluorescent paint coating.

54. The connectors of claim 39, wherein the colored indicator has an ink coating.

55. The connectors of claim 50, wherein the colored coating is an epoxy coating.

* * * * *